Patented July 1, 1947

2,423,186

UNITED STATES PATENT OFFICE 2,423,186

METHOD OF CONDITIONING A CATALYST FOR THE PRODUCTION OF VINYL CYANIDE

Charles R. Harris, Lockport, and Wilbur W. De Atley, Niagara Falls, N. Y., assignors to E. I. du Pont de Nemours & Company, Wilmington, Del., a corporation of Delaware No Drawing. Application January 22, 1944, Serial No. 519,382

2 Claims. (Cl. 252—259.3)

This invention relates to the production of vinyl cyanide and, more particularly, to the production of vinyl cyanide by the catalytic reaction between HCN and acetylene.

A valuable known process for producing vinyl cyanide comprises reacting hydrocyanic acid with acetylene in the vapor phase in the presence of a suitable catalyst. A catalyst suitable for this reaction comprises a solid, porous support impregnated with an alkali metal cyanide or mixture of alkali metal cyanides. For example, a preferred catalyst for the reaction is ordinary wood charcoal impregnated with sodium cyanide or a mixture of sodium and potassium cyanides.

An object of the present invention is to provide an improved method for the production of vinyl cyanide by reacting hydrocyanic acid with acetylene in the presence of a catalyst comprising a porous support impregnated with alkali metal cyanide. A further object is to provide a method for increasing the activity of the above-mentioned type of catalyst in the aforesaid reaction. The invention also includes novel methods for preparing or treating the above-described type of catalyst. Other objects will be apparent from the following description.

We have discovered that in making vinyl cyanide by reacting hydrocyanic acid with acetylene in the presence of a catalyst which comprises a solid, porous support impregnated with one or more alkali metal cyanides, the initial activity of the catalyst is markedly increased by heating the catalyst to a temperature of at least about 500° C. before placing it in use.

The catalyst may be prepared by impregnating a variety of porous, solid materials with one or more alkali metal cyanides. Examples of such solid catalyst supports are vegetable charcoals, coke, activated carbon, and other solid carbonaceous materials, alumina, silica, and porcelain. Such materials may be impregnated with the alkali metal cyanide by various methods, the present invention not being restricted to any particular method of impregnation. In one method given by way of example, the alkali metal cyanide is dissolved in a suitable solvent, e. g., water or liquid anhydrous ammonia, the solid granular material is soaked in the solution, then dried, preferably at a low temperature. In another method of impregnation, the solid material is soaked in a bath of molten anhydrous cyanide, excess molten material is drained off and the mass allowed to cool. We generally prefer to prepare the catalyst by impregnation with the anhydrous ammonia solution.

Any of the cyanides of the alkali metals, i. e., sodium, potassium, lithium, cesium, or rubidium, or mixtures thereof, may be used to prepare the catalysts of this invention. We generally prefer to use sodium and potassium cyanides and the best results are usually obtained with mixtures of sodium and potassium cyanides, for example, a mixture of equal parts by weight of these two cyanides. If desired, the catalysts may also include other alkali metal salts, e. g., carbonates, chlorides, etc., alkali metal hydroxides, and other known catalysts for the reaction, but we prefer to use cyanides alone.

In accordance with our invention, the catalyst mass made by impregnating a porous solid with cyanide as above described is heated to a temperature of at least about 500° C. for at least one hour. In general, the activity of the catalyst increases in proportion to the time and temperature of the heat-treating operation. We have found that best results are obtained by using temperatures 600 to 800° C., or higher, for a period of at least 10 hours, for example, for 10 to 50 hours. We may heat the catalyst to temperatures of 1200 to 1400° C., providing the treating temperature is kept below the melting point of the solid catalyst support. We prefer to use refractory supports such as carbon or silica and heat treat at 600 to 1200° C.

We have found that the atmosphere in which the catalyst is heated is not important and that substantially equal results are obtained when the catalyst is heated in reducing gases such as hydrogen or hydrocarbon vapors, in oxidizing gases such as air or carbon dioxide, or inert gases such as nitrogen. When the catalyst support is composed of carbon or other oxidizable materials and the catalyst heated in air or other oxidizing gas, it is, of course, essential that the material be heated in an enclosed space to avoid undue destruction of the catalyst support by oxidation. However when that type of catalyst is heated in a retort or other suitable enclosed space filled with air, for example, the amount of carbon oxidized is practically negligible and it is unnecessary to take the precaution of using a non-oxidizing atmosphere.

After the heat treatment, the catalyst is ready for use in the catalytic process for reacting hydrocyanic acid with acetylene to produce vinyl cyanide and may be used in that process in the conventional manner. If desired, the hot catalyst may be placed in use directly after the heat treatment, before cooling at a temperature below the desired reaction temperature, but such precaution is not necessary. We have found that after the heat treatment the catalyst may be cooled at any desired rate and then may be stored for an indefinite time at room temperature exposed to the air substantially without loss or change of catalytic activity.

The following examples further illustrate the practice of our invention and the results thereby obtained:

*Example 1*

Granular wood charcoal, which had been heated to remove volatile materials was thoroughly wetted with a solution of equal parts by weight of sodium and potassium cyanides in liquid, anhydrous ammonia. The ammonia then was permitted to evaporate, leaving the charcoal impregnated with the cyanide mixture. Separate portions of the catalyst thus prepared were subjected to heat treatment in retorts under different gas atmospheres at temperatures of about 500 to 670° C. for 4 to 6 hours, then cooled to room temperature and stored in open containers. One portion was not heat treated.

The catalysts so prepared were used in successive runs in a standard process for reacting hydrocyanic acid with acetylene to produce vinyl cyanide. In this process, a mixture of hydrocyanic acid with an excess of acetylene was passed through a layer of the granular catalyst at a temperature of 590 to 610° C. and vinyl cyanide was recovered from the off-gases. The amount of unreacted hydrocyanic acid in the off-gases was determined by a standard method of analysis. The following results were obtained:

| Run | Blank | Atmospheres | | | | | | |
|---|---|---|---|---|---|---|---|---|
| | A | B | C | D | E | F | G | |
| Pretreatment: | | | | | | | | |
| Gas Used | NONE | $H_2$ | $N_2$ | Nat. Gas | $NH_3$ | Air | $CO_2$ | |
| Temp., °C | | 590–650 | 550–650 | 550–650 | 550–650 | 500–675 | 600–645 | |
| Time, Hours | | 5 | 5 | 5 | 4 | 4 | 6 | |
| Per Cent HCN Reacting After— | | | | | | | | |
| 1 hr | 35 | 76 | 81 | 74 | 65 | 76 | 75 | |
| 5 hrs | 47 | 70 | 66 | 59 | 54 | 68 | 66 | |
| 10 hrs | 37 | 57 | 62 | 57 | 49 | 54 | 43 | |

*Example 2*

The procedure of Example 1 was followed, except that all portions of the catalyst (except one portion not heat treated) were heated in the presence of air, in closed retorts, for different times and at different temperatures. The following results were obtained:

| Run | Heat Treatment | | Per Cent HCN Reacting After— | | |
|---|---|---|---|---|---|
| | Time, Hours | Temp., °C. | 1 hr. | 5 hrs. | 10 hrs. |
| A | 4 | 520–540 | 57 | 45 | 32 |
| B | 21 | 470–490 | 58 | 67 | 59 |
| C | 4 | 500–675 | 76 | 68 | 54 |
| D | 9 | 570–600 | 81 | 74 | 65 |
| E | 20 | 600–640 | 81 | 78 | 64 |
| F | 46 | 590–640 | 78 | 80 | 70 |
| G | 14 | 700–800 | 88 | 79 | 75 |
| H | 2 | 780–820 | 89 | 80 | 65 |
| I | 20 | 570–900 | 88 | 90 | |
| J [1] | None | | 35 | 47 | 37 |

[1] Run A of Example 1.

*Example 3*

A portion of the catalyst of Example 1 was heated in the presence of air in a closed retort for 24 hours at a temperature of 650 to 735° C. After cooling and storage under atmospheric conditions this catalyst was used to make vinyl cyanide by the method of Example 1 in a run lasting more than 120 hours of continuous operation. This was repeated, using as catalyst another portion of the catalyst of Example 1 which had not been heat treated. In each of these runs the reaction mixture was diluted with natural gas and the following feed rates were employed:

| Total Elapsed Time, Hours | Feed Rates of Constituents of Reaction Mixture, cc./min. | | |
|---|---|---|---|
| | HCN | $C_2H_2$ | Natural Gas |
| Start, to 66 | 250 | 750 | 6,000 |
| After 66 to 114 | 500 | 1,000 | 5,500 |
| After 114 to 120 | 700 | 1,400 | 4,900 |

The following results were obtained:

| Elapsed time | Grams HCN Reacting, per Minute | |
|---|---|---|
| | Catalyst Heat treated | Catalyst Not Heat Treated |
| 1 Hour | 0.265 | 0.100 |
| 5 Hours | 0.254 | 0.153 |
| 20 Hours | 0.178 | 0.070 |
| 40 Hours | 0.075 | 0.043 |
| 60 Hours | 0.055 | 0.033 |
| 75 Hours | 0.170 | 0.110 |
| 95 Hours | 0.155 | 0.110 |
| 114 Hours | 0.135 | 0.090 |
| 120 Hours | 0.250 | 0.200 |

We claim:

1. The method for conditioning a catalyst for reacting hydrocyanic acid with acetylene in the vapor phase to produce vinyl cyanide, said catalyst comprising a solid, porous, granular material impregnated with a mixture of sodium and potassium cyanides, which comprises impregnating said granular material with a solution of sodium and potassium cyanides in liquid ammonia to produce a catalyst mass, heating said catalyst to a temperature between 500° C. and 1400° C. for at least one hour before exposing it to the hydrocyanic acid-acetylene reaction mixture.

2. The method for conditioning a catalyst for reacting hydrocyanic acid with acetylene in the vapor phase to produce vinyl cyanide, said catalyst comprising granular charcoal impregnated with a mixture of sodium and potassium cyanides, which comprises impregnating said granular charcoal with a solution of sodium and potassium cyanides in liquid ammonia to produce a catalyst mass, heating said catalyst to a temperature of about 600° C. to 1200° C. for 10 to 50 hours before exposing it to the hydrocyanic acid-acetylene reaction mixture.

CHARLES R. HARRIS.
WILBUR W. DE ATLEY.

REFERENCES CITED

The following references are of record in the file of this patent:

UNITED STATES PATENTS

| Number | Name | Date |
|---|---|---|
| 1,944,161 | Baxter | Jan. 23, 1934 |
| 1,352,177 | Clancy | Sept. 7, 1920 |
| 1,452,027 | Cederberg | Apr. 17, 1923 |
| 2,272,301 | Kinneberg | Feb. 10, 1942 |
| 2,278,223 | Sturgeon | Mar. 31, 1942 |

FOREIGN PATENTS

| Number | Country | Date |
|---|---|---|
| 559,734 | Germany | Sept. 23, 1932 |